United States Patent
Di Giovanni et al.

(10) Patent No.: US 11,137,063 B2
(45) Date of Patent: Oct. 5, 2021

(54) MECHANICAL REDUCTION GEAR FOR AIRCRAFT TURBOMACHINE

(71) Applicant: SAFRAN TRANSMISSION SYSTEMS, Colombes (FR)

(72) Inventors: Jean-Charles Michel Pierre Di Giovanni, Issy-les-Moulineaux (FR); Balint Pap, Levallois (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/852,068

(22) Filed: Apr. 17, 2020

(65) Prior Publication Data

US 2020/0332884 A1    Oct. 22, 2020

(30) Foreign Application Priority Data

Apr. 19, 2019   (FR) ..................................... 1904227

(51) Int. Cl.
     *F16H 57/04*     (2010.01)
     *F02C 7/06*      (2006.01)
     *F02C 7/36*      (2006.01)

(52) U.S. Cl.
     CPC ........... *F16H 57/0482* (2013.01); *F02C 7/06* (2013.01); *F02C 7/36* (2013.01); *F16H 57/0479* (2013.01)

(58) Field of Classification Search
None
See application file for complete search history.

(56) References Cited

U.S. PATENT DOCUMENTS

| | | | |
|---|---|---|---|
| 8,298,108 B2 * | 10/2012 | Nishida | F16C 33/1065 |
| | | | 475/159 |
| 2005/0049101 A1 | 3/2005 | Kumashi et al. | |
| 2013/0225353 A1 | 8/2013 | Gallet et al. | |
| 2018/0313404 A1 | 11/2018 | Hoelzl | |
| 2020/0165980 A1 * | 5/2020 | Di Giovanni | F16H 57/042 |

FOREIGN PATENT DOCUMENTS

| | | | |
|---|---|---|---|
| DE | 1985822 U | 5/1968 | |
| DE | 102017120883 A1 * | 10/2018 | ......... F16H 57/0479 |
| EP | 2554874 A2 * | 2/2013 | ......... F16H 57/0479 |

(Continued)

OTHER PUBLICATIONS

Preliminary Research Report received for French Application No. 1904227, dated Dec. 6, 2019, 5 pages (1 page of French Translation Cover Sheet and 4 pages of original document).

*Primary Examiner* — Dirk Wright
(74) *Attorney, Agent, or Firm* — Womble Bond Dickinson (US) LLP (57) ABSTRACT

A mechanical reduction gear for a turbomachine, in particular for an aircraft, this reduction gear including a sun gear having an axis of rotation, a ring gear that extends around the sun gear, planet gears which are meshed with the sun gear and the ring gear, and a lubricating oil distributor which is configured to supply oil to the internal cavities of tubular supports of the planet gears, wherein each of the tubular supports includes a first angular sector including oil conveying pipes and a first outer peripheral surface for forming an oil film, and a second angular sector including a second outer peripheral surface in which a breaking tub of the oil film and recovering of the oil is formed.

12 Claims, 5 Drawing Sheets

(56) References Cited

FOREIGN PATENT DOCUMENTS

| | | | |
|---|---|---|---|
| EP | 3093514 A1 | 11/2016 | |
| EP | 3284975 A1 * | 2/2018 | ............. F16H 57/08 |
| EP | 3396187 A1 | 10/2018 | |
| FR | 2987416 A1 | 8/2013 | |
| FR | 2995055 A1 | 3/2014 | |
| FR | 3041054 A1 | 3/2017 | |
| WO | 2010/092263 A1 | 8/2010 | |
| WO | 2016/079415 A1 | 5/2016 | |

* cited by examiner

MECHANICAL REDUCTION GEAR FOR AIRCRAFT TURBOMACHINE

TECHNICAL FIELD OF THE INVENTION

The present invention concerns the field of the mechanical reduction gears for turbomachines, in particular for an aircraft.

BACKGROUND

The prior art comprises in particular documents WO-A1-2010/092263, FR-A1-2 987 416, FR-A1-3 041 054, EP-A1-3396187, DE-U-1985822 and WO-A1-2016/079415.

The aim of a mechanical reduction gear is to change the speed and torque ratio between the input axe and output axe of a mechanism.

The new generations of dual-flow turbomachines, in particular those with a high dilution ratio, comprise a mechanical reduction gear to drive the shaft of a fan. Usually, the purpose of the reduction gear is to transform the so-called fast rotation speed of the shaft of a power turbine into a slower rotation speed for the shaft driving the fan.

Such a reduction gear comprises a central pinion, called sun gear, a ring gear and pinions called planet gears, which are engaged between the sun gear and the ring gear. The planet gears are held by a frame called planet carrier. The sun gear, the ring gear and the planet carrier are planetary gears because their axes of revolution coincide with the longitudinal axis X of the turbomachine. The planet gears each have a different axis of revolution Y, they are equally distributed on the same operating diameter around the axis of the planetary gears. These axes Y are parallel to the longitudinal axis X.

There are several reduction gear architectures. In the prior art of double-flow turbomachines, the reduction gears are of the planetary or epicyclic type. In other similar applications, there are so-called differential or compound architectures.

On a planetary reduction gear, the planet carrier is fixed and the ring gear constitutes the output shaft of the device which rotates in the opposite direction to the sun gear.

On an epicyclic reduction gear, the ring gear is fixed and the planet carrier constitutes the output shaft of the device which rotates in the same direction as the sun gear.

On a differential reduction gear, no element is fixed in rotation. The ring gear rotates in the opposite direction of the sun gear and the planet carrier.

The reduction gears may have one or more meshing stages. This meshing is achieved in different ways such as by contact, by friction or even by magnetic fields. There are several types of contact meshing, such as straight or herringbone toothings.

A reduction gear must be lubricated and the supply of lubricating oil to the rotating components of a reduction gear can be problematic. The oil is usually supplied to the reduction gear via a lubricating oil distributor.

The planet gears are guided in rotation by bearings which are lubricated. The bearings may consist of rolling elements (rolling bearings, roller bearings, tapered roller bearings, etc.) or may be hydrodynamic bearings. In the latter case, each planet gear is rotatably mounted on and around a tubular support of the planet carrier, which is supplied with oil and is configured to form an oil film between the outer periphery of the support and the inner periphery of the planet gear. For this purpose, in the current technique, each planet gear comprises an internal cylindrical surface which extends around an external cylindrical surface of the support and which delimits with the latter an annular space for the formation of the oil film. This space is supplied with oil through oil conveying pipes which are formed in the support and extend from the external cylindrical surface to an internal cavity of the support which is supplied with oil by the aforementioned distributor.

This patent application concerns a reduction gear whose planet gears are guided by hydrodynamic bearings.

However, there is a problem with the current technology. The solid components of the bearing are mass elements of the reduction gear, usually between 3 and 7 in number. In addition to having an impact on the weight of a engine, this mass orbits around the axis of the engine (planetary), which has many adverse consequences such as unbalance, high amplitude vibrations and radial forces on the planet carrier that cause misalignment between the sun gear, the planet gears and the ring gear. The mass of the hydrodynamic bearing in orbit shears the oil in the bearing, resulting in losses, especially friction losses in the bearings of the reduction gear, which are generated in the zone where the oil film breaks. The hot oil cannot be discharged through the lightly loaded side of the bearing and this hot oil which is not discharged during the first rotation tends to heat up the cold oil coming out of the oil conveying pipes, which prevents the bearing from discharging heat properly.

This invention proposes a simple, effective and economical improvement to improve the circulation and discharge of oil in a turbomachine while preferably reducing the mass of the bearings.

SUMMARY OF THE INVENTION

The invention concerns a mechanical reduction gear for a turbomachine, in particular for an aircraft, this reduction gear comprising:
 a sun gear having an axis of rotation,
 a ring gear which extends around the sun gear,
 planet gears which are meshed with the sun gear and the ring gear and which are held by a planet carrier which is configured to be in rotation around said axis, each of the planet gears being guided in rotation by a hydrodynamic bearing formed by a tubular support around which the planet gear is rotatably mounted, and
 a lubricating oil distributor which is configured to supply oil to the internal cavities of said tubular supports, each of the tubular supports comprising oil conveying pipes for conveying oil from its internal cavity to its outer periphery for the formation of an oil film between the support and the planet gear,
 characterized in that each of the tubular supports comprises:
 a first angular sector around an axis of the support, which comprises said conveying pipes and a first outer peripheral surface for forming said oil film, and
 a second angular sector around an axis of the support, which comprises a second outer peripheral surface in which a breaking tub of the oil film and recovering of the oil is formed.

The invention thus proposes to associate two distinct functions to two distinct angular sectors of each support of a planet gear, and thus of each hydrodynamic bearing. Each support comprises a first sector which is shaped to form the oil film and therefore an active zone which preferably has a predetermined circumferential range around the axis of the support and of rotation of the planet gear. This first sector includes the oil conveying pipes. Each support comprises a second sector which is shaped to break the oil film in an inactive zone. The planet gear has a tendency to go out of axis with respect to its support. This axial deviation results in an uneven clearance between the two elements. In fact, the clearance is minimal on the side of the axis of the planet carrier and maximal at the outer periphery of the planet carrier. The breaking of the oil film is caused by a tub, i.e. a recess formed at the periphery of the support, configured to collect the oil coming out of the active zone. It is thus understood that the oil at a so-called cold temperature is conveyed through the pipe to the periphery of the support to form an oil film in the active zone and over the entire range of the first sector. Due to the shearing and the friction, the oil is heated as it flows through this active zone. Some of the hot oil is discharged at the sides of the bearing. The hot oil that is not discharged in this way is recirculated in the bearing and is discharged via the radial clearance due to centrifugal forces and then reaches the tub for discharge. This hot oil therefore does not heat up the cold oil supplied through the conveying pipes thus improving lubrication by avoiding heating up the cold oil with the hot oil. In addition to the permitted cooling, this also allows the bearing to use only an oil which has not been worked on and which therefore retains at best its lubrication characteristics (no impurities).

The solution proposed below is compatible with an epicyclic and differential reduction gear whose ring gear is fixed or movable in the reference mark of the engine. It is compatible with any type of toothing (straight, herringbone), any type of planet carrier, whether one-piece or cage-door/cage type.

The reduction gear according to the invention may comprise one or more of the following characteristics, taken in isolation from each other, or in combination with each other:
- said first sector and said second sector are distinct;
- the conveying pipes are substantially located in the same plane passing through the axis of the support;
- the conveying pipes open into the same groove formed in said first peripheral surface;
- the first sector has an angular range greater than or equal to that of the second sector;
- the angular extensions of the first and second sectors are equal to 360°;
- the first sector has an angular range between 180° and 270°, and said second sector has an angular range between 90° and 180°;
- the tub has a general elongated shape in the circumferential direction and extends over the entire angular range of said second sector;
- the tub is axially delimited by two side walls which extend in the circumferential direction and which form said second peripheral surface, and by two circumferential end walls, one of which is located in the vicinity of said conveying pipes;
- each of the tubular supports comprises a first annular groove located on a first axial end of the support, and a second annular groove located on a second axial end of the support, the first and second grooves being oriented in opposite axial directions, and wherein oil discharge pipes provide fluid communication between the tub and these grooves; the first side is for example a front or upstream side and the second side is then a rear or downstream side;
- the discharge pipes comprise openings in the tub, which are distributed over the entire circumferential range of the tub;
- the discharge pipes comprise openings in the tub, which are located over only part of the circumferential range of this tub and which are spaced apart from said conveying pipes.

The invention furthermore concerns a turbomachine, in particular for an aircraft, comprising a mechanical reduction gear as described above.

BRIEF DESCRIPTION OF THE FIGURES

Other characteristics and advantages will be apparent from the following description of a non-limiting embodiment of the invention with reference to the drawings annexed thereto on which.

DETAILED DESCRIPTION OF THE INVENTION

Figure 1:
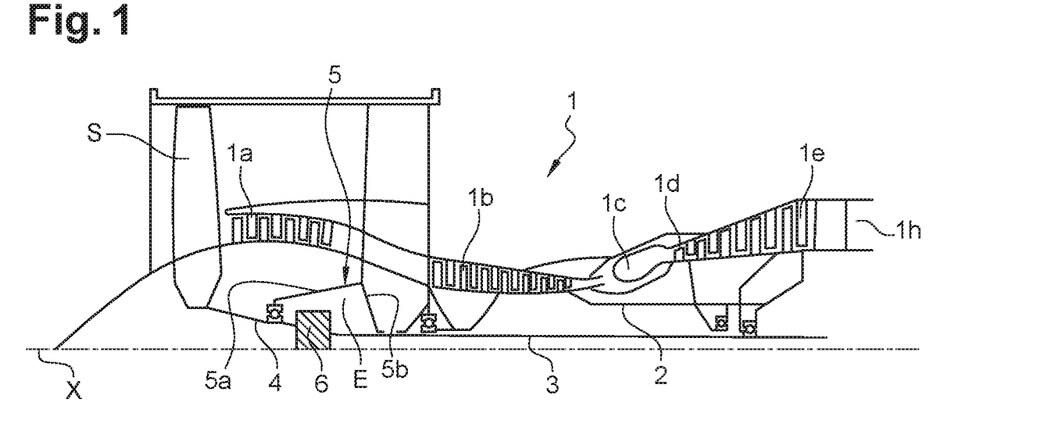
FIG. 1 is a schematic axial section view of a turbomachine using the invention.

FIG. 1 describes a turbomachine 1 which conventionally comprises a fan S, a low-pressure compressor 1a, a high-pressure compressor 1b, an annular combustor chamber 1c, a high-pressure turbine 1d, a low-pressure turbine 1e and an exhaust nozzle 1h. The high-pressure compressor 1b and the high-pressure turbine 1d are connected by a high-pressure shaft 2 and form a high-pressure (HP) body with it. The low-pressure compressor 1a and the low-pressure turbine 1e are connected by a low-pressure shaft 3 and form a low-pressure body (LP) with it.

The fan S is driven by a fan shaft 4 which is driven to the LP shaft 3 by means of a reduction gear 6. This reduction gear 6 is usually of the planetary or epicyclic type.

The following description refers to a reduction gear of the epicyclic type, the planet carrier and the sun gear are in rotation, the ring gear of the reduction gear being fixed in the reference of the engine.

The reduction gear 6 is positioned in the upstream part of the turbomachine. In this patent application, the terms upstream and downstream refer to the general flow of gases in the turbomachine, along its axis of extension or rotation of its rotors. A fixed structure comprising schematically, here, an upstream part 5a and a downstream part 5b which makes up the engine casing or stator 5 is arranged so as to form an enclosure E surrounding the reduction gear 6. This enclosure E is herein closed upstream by seals at the level of a bearing allowing the passage of the fan shaft 4, and downstream by seals at the level of the passage of the LP shaft 3.

Figure 2:
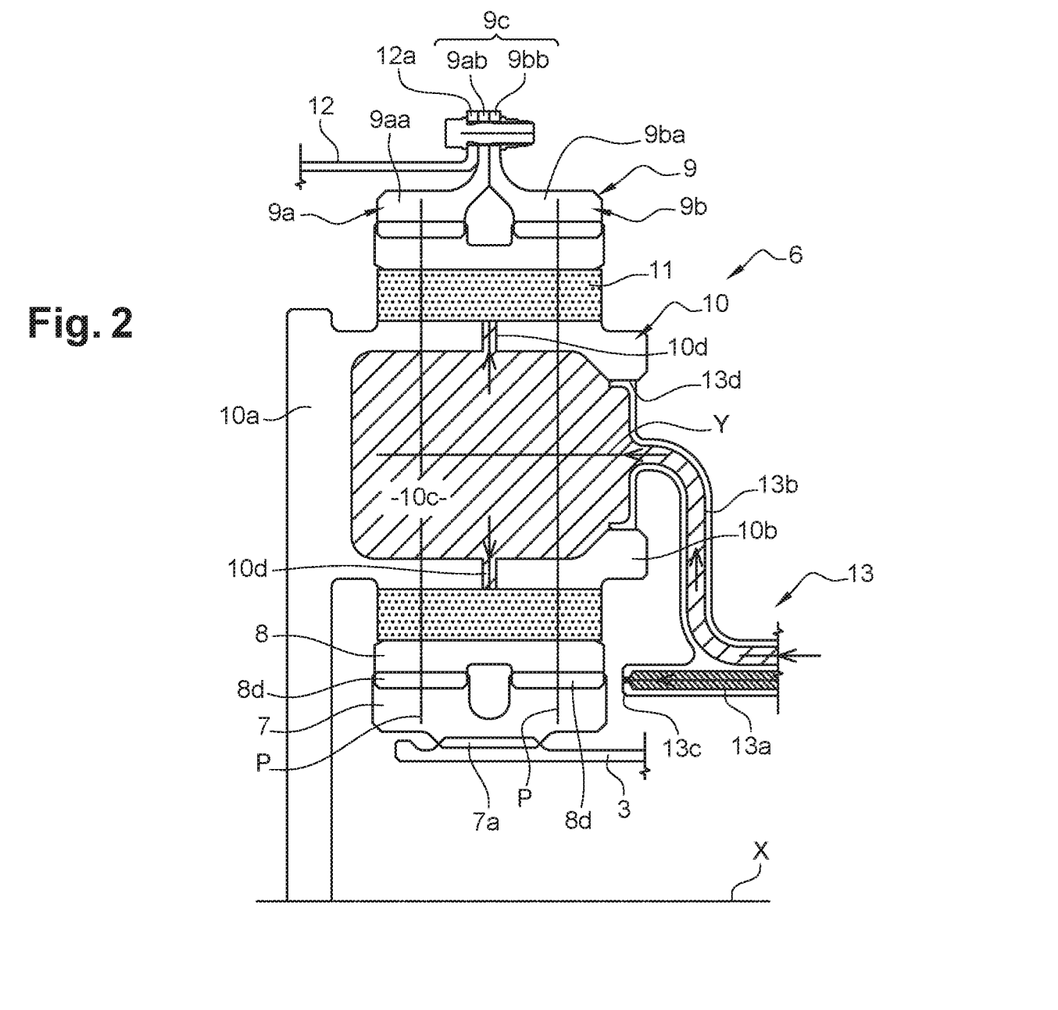
FIG. 2 is a partial axial sectional view of a mechanical reduction gear.

FIG. 2 shows an epicyclic reduction gear 6. The reduction gear 6 is connected on the input side to the LP shaft 3, e.g. via internal splines 7a. In this way, the LP shaft 3 drives a planetary pinion called the sun gear 7. Classically, the sun gear 7, whose axis of rotation is combined with that of the turbomachine X, drives a series of pinions called planet gears 8, which are equally distributed on the same diameter around the axis of rotation X. This diameter is equal to twice the operating centre distance between the sun gear 7 and the planet gears 8. The number of planet gears 8 is generally defined between three and seven for this type of application.

The assembly of planet gears 8 is held by a frame called planet carrier 10. Each planet gear 8 rotates around its own axis Y and meshes with the ring gear 9.

On the output side we have:
In this epicyclic configuration, the set of the planet gears 8 drives the planet carrier 10 around the axis X of the turbomachine. The ring gear is fixed to the engine casing or stator 5 via a ring gear carrier 12 and the planet carrier 10 is fixed to the fan shaft 4.
In another planetary configuration, the assembly of the planet gears 8 is held by a planet carrier 10 which is attached to the engine casing or stator 5. Each planet gear drives the ring gear which is brought back to the fan shaft 4 via a ring gear carrier 12.

Each planet gear 8 is mounted freely in rotation by means of a bearing 11, e.g. of the rolling bearing or hydrodynamic bearing type. Each bearing 11 is provided on one of the tubular supports 10b of the planet carrier 10 and all the supports are positioned relative to each other by means of one or more structural frames 10a of the planet carrier 10. There is a number of tubular supports 10b and bearings 11 equal to the number of planet gears. For operational, mounting, manufacturing, control, repair or replacement reasons, the supports 10b and the frame 10a can be separated into several parts.

For the same reasons as mentioned above, the toothing of a reduction gear can be separated into several helixes, each having a median plane P. In our example, we detail the operation of a reduction gear with several helices with one ring gear separated into two half-ring gears:
An upstream half ring gear 9a consisting of a rim 9aa and a fastening half-flange gab. On the rim 9aa is located the upstream helix of the toothing of the reduction gear. This upstream helix meshes with that of the planet gear 8 which meshes with that of the sun gear 7.
A downstream half ring gear 9b consists of a rim 9ba and a fastening half-flange 9bb. On the rim 9ba is located the downstream helix of the toothing of the reduction gear. This downstream helix meshes with that of the planet gear 8 which meshes with that of the sun gear 7.

If the widths of helix vary between the sun gear 7, the planet gears 8 and the ring gear 9 because of the toothing overlaps, they are all centred on a median plane P for the upstream helixes and on another median plane P for the downstream helixes. In the case of a double row roller bearing, each row of rolling elements is also preferably, but not necessarily, centred on two median planes.

The fastening half-flange gab of the upstream ring gear 9a and the fastening half-flange 9bb of the downstream ring gear 9b form the fastening flange 9c of the ring gear. The ring gear 9 is fixed to a ring gear carrier by assembling the fastening flange 9c of the ring gear and the fastening flange 12a of the ring gear carrier using a bolted assembly for example.

The arrows in FIG. 2 describe the oil flow in the reduction gear 6. The oil enters reduction gear 6 from the stator part 5 into a distributor 13 by different means which will not be specified in this view because they are specific to one or more types of architecture. The distributor 13 comprises of injectors 13a and arms 13b. The function of the injectors 13a is to lubricate the toothings and the function of the arms 13b is to lubricate the bearings. The oil is fed to the injector 13a to exit through the end 13c to lubricate the toothings. The oil is also fed to arm 13b and flows through the supply port 13d of the bearing 11. The oil then flows through the support 10b into one or more cavities 10c to exit through pipes 10d to lubricate the bearings of the planet gears.

FIGS. 3 to 6 represent a first embodiment of a mechanical reduction gear 6 according to the invention.

The above description applies to this reduction gear 6 insofar as it does not contradict the following.

The tubular support 10b of each planet gear 8 comprises a one-piece body in the example shown which comprises two coaxial annular walls 20a, 20b which extend one around the other and which are connected to each other by an annular web 20c.

The inner annular wall 20b is closed by a bulkhead 20d and has an axial end open on the opposite side for receiving the oil supplied by the oil distributor (not shown). The inner wall 20b thus defines the cavity 10c for receiving the lubricating oil.

The outer annular wall 20a has an axial length or dimension measured along the axis Y which is proportional to that of the wall 20b. The length of the wall 20b is here equal to the length of the wall 20a with the addition of a double axial clearance located at each end of the support 10b. The web 20c has a shorter length than that of the walls 20a, 20b, this length being measured in the same way. The axial ends of the walls 20a, 20b delimit between them annular grooves 21a, 21b. This configuration provides a certain flexibility to the support 10b at the level of each of its axial ends.

The support 10b thus comprises a first annular groove 21a located on one side and the opening of which opens in the axial direction, and a second annular groove 21b located on the opposite side and the opening of which opens axially on the side opposite to the groove 21a. These grooves 21a, 21b have a general U-shaped cross-section.

The support 10b comprises lubricating oil conveying pipes 10d for conveying oil from the cavity 10c to the outer periphery of the support 10b. In the example shown, there are three such pipes 10d, although this number is not restrictive. They each have a general elongated and cylindrical shape. They are aligned and evenly spaced in a plane M passing through the axis Y of the support 10b.

Figure 4:
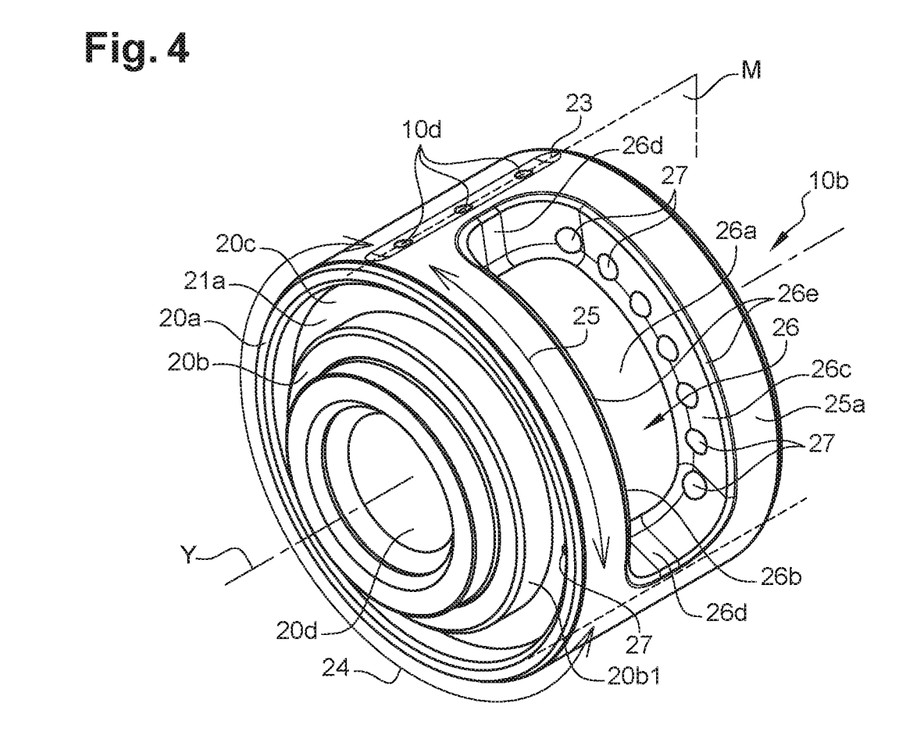
FIG. 4 is a perspective view of a planet gear tubular support of the reduction gear in FIG. 3.
Figure 5:
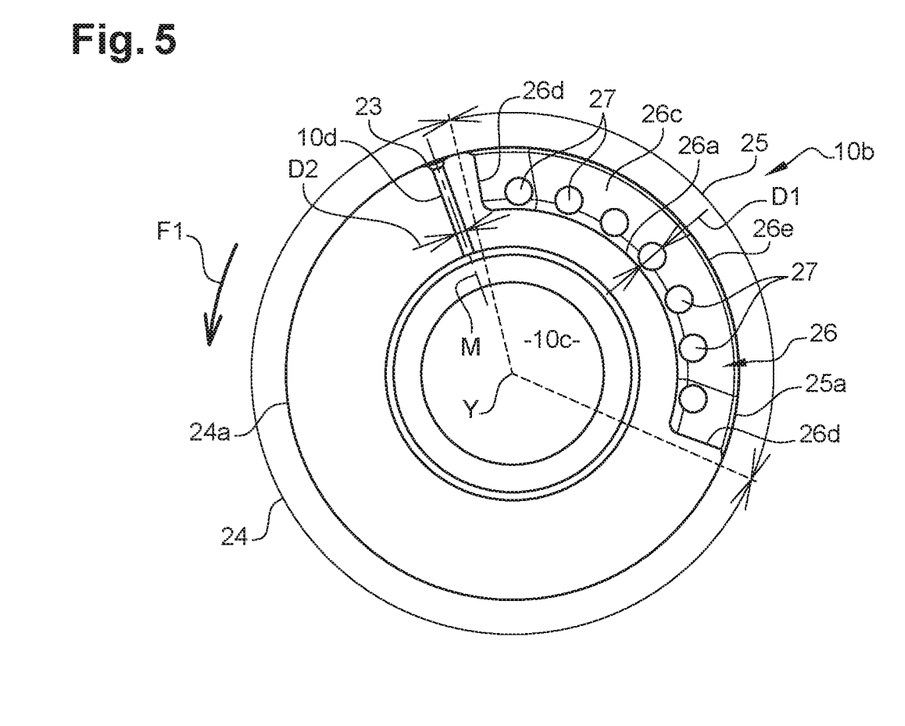
FIG. 5 is a cross-sectional view of the support in FIG. 4.

FIGS. 4 and 5 show that the radially outer ends of the pipes 10d open in the same groove 23 formed on the outer periphery of the support 10b. This groove 23 has a general elongated shape and extends substantially in the plane M.

As shown in FIG. 5, the support 10b can be considered as comprising or consisting of two angular sectors 24, 25 extending around the axis Y, namely a first sector 24 for forming an oil film and a second sector 25 for breaking of the oil film.

Preferably, the first sector 24 has an angular range greater than or equal to that of the second sector 25. The first sector may have an angular range between 180° and 270°, and the second sector may have an angular range between 90° and 180°.

Figure 8:
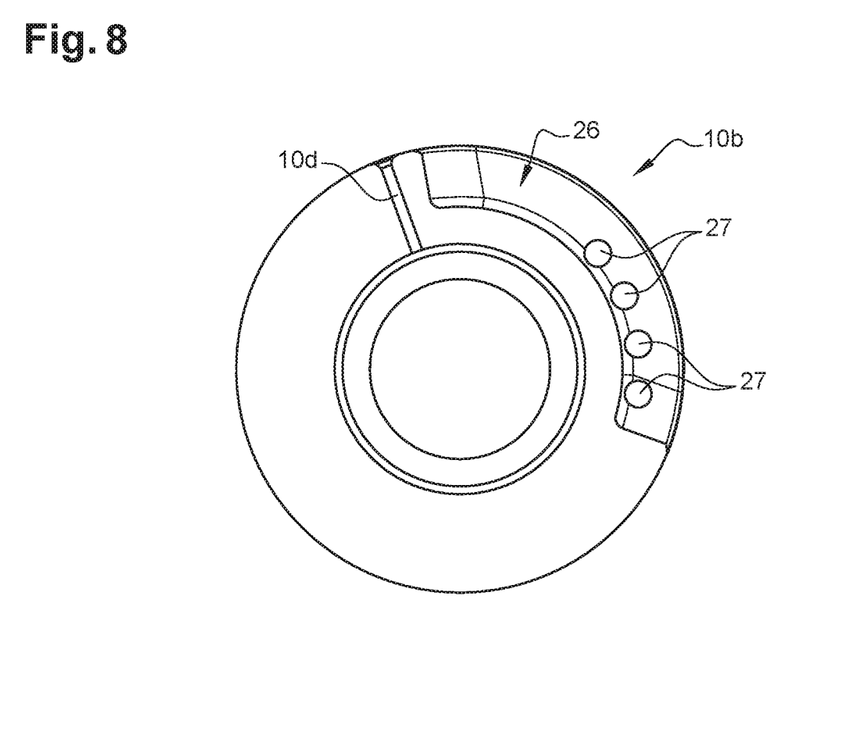
FIG. 8 is a cross-sectional view of the support in FIG. 7.

The first sector 24 comprises an outer peripheral surface 24a which is herein cylindrical and configured to delimit with an inner cylindrical surface 8a of the bearing 8 a circumferential oil receiving and oil film forming space (FIG. 8).

Figure 6:
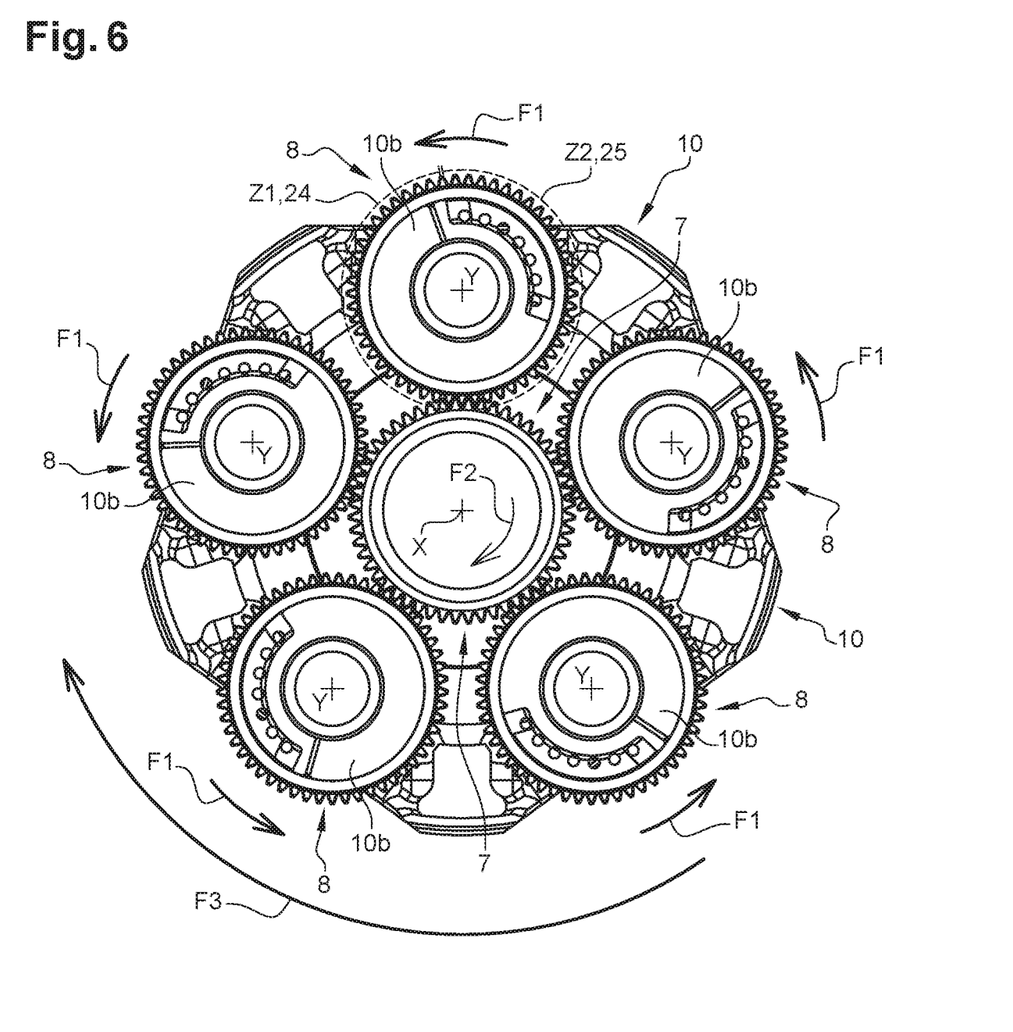
FIG. 6 is a cross-sectional view of the reduction gear in FIG. 3.

The pipes 10d and the groove 23 are herein located at one circumferential end of the sector 24. The oil conveyed by the pipes 10d is thus intended to flow circumferentially over the entire zone of the first sector 24. The direction of rotation of the planet gear 8 on the support 10*b*, indicated by the arrows F1 in FIGS. 5 and 6, must therefore be chosen to ensure the formation of the oil film. In FIG. 6, the arrow F2 represents the direction of rotation of the sun gear 7 and the arrow F3 represents the direction of rotation of the planet carrier 10.

The second sector 25 comprises an outer peripheral surface 25*a* which is herein cylindrical and which comprises a tub 26 for breaking the oil film formed on the sector 24.

The tub 26 has a general elongated shape in the circumferential direction and extends advantageously over the entire circumferential range of the sector 25. It is open radially outwards and is defined radially inwards by a bottom surface 26*a* which is curved around the axis Y, and which can be aligned with the outer cylindrical surface 20*b*1 of the inner wall 20*b* (see FIGS. 3 and 4).

Figure 3:
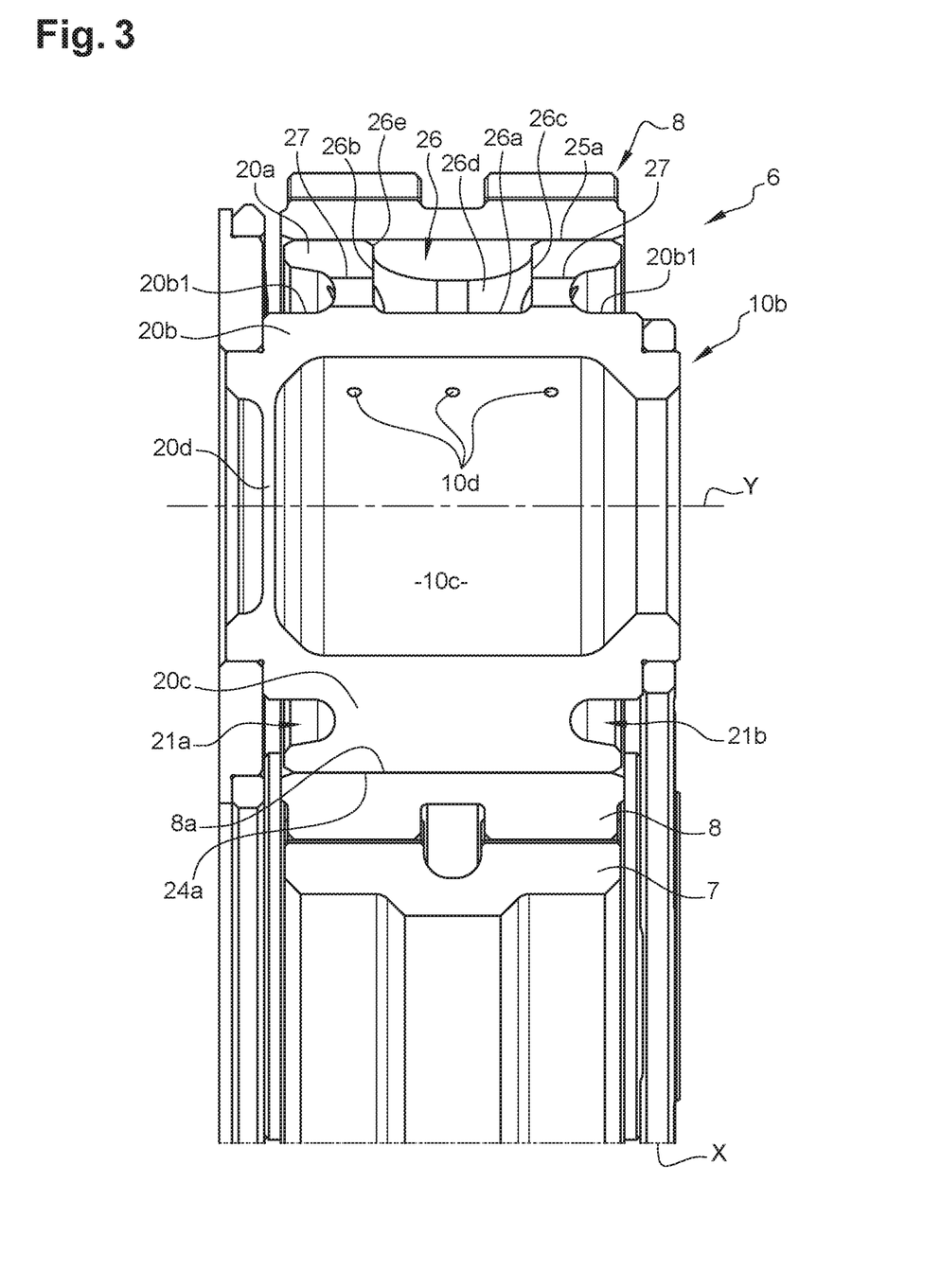
FIG. 3 is another view similar to FIG. 2 and represents a embodiment of a mechanical reduction gear according to the invention.

The tub 26 is bounded axially by two side walls 26*b*, 26*c* which extend in the circumferential direction around the axis Y and which form the second peripheral surface 25*a*. The tub 26 is further delimited by two circumferential end walls 26*d*, one of which is located in the vicinity of the conveying pipes 10*d*.

FIGS. 3 and 4 show that the tub 26 is centred on the support 10*b* along the axis Y, i.e. the walls 26*b*, 26*c* have essentially the same thickness or axial dimension measured along this axis Y.

The radially outer peripheral edge 26*e* of the tub 26 can be chamfered to facilitate the flow of oil from the surface 25*a* into the tub 26 (FIGS. 3 and 4).

Oil discharge pipes 27 are formed in the support 10*b* and extend between the tub 26 and the grooves 21*a*, 21*b*. These pipes 27 extend herein parallel to the axis Y and comprise a first set which open into the bottom of the groove 21*a* and one of the side surfaces of the tub 26. This first set of pipes is thus formed in the wall 26*b*. Another set of pipes 27 passes through the wall 26*c* and opens into the bottom of the groove 21*b* and on the other side surface of the tub 26. The orientation of the pipes 27 is not exhaustive.

The pipes 27 are located close to the bottom surface 26*a* of the tub 26 and are herein distributed over the entire circumferential range of the tub.

The number of pipes 27 in each set herein is 7, although this number is not exhaustive (for example, it is between 3 and 20). In the example shown, the pipes 27 have a diameter D1 which is greater than the diameter D2 of the pipes 10*d* and is for example twice the diameter D2 (FIG. 5). This diameter D1 can be close to the height or radial dimension of the grooves 21*a*, 21*b*, as can be seen in the FIG. 3. Independently of the diameter D2 of the pipes 10*d*, the diameter D1 of the pipes 27 can be the largest possible depending on the radial dimension of the grooves 21*a*, 21*b*.

The oil film that forms on the surface 24*a* of the first sector 24 is intended to be broken at the level of the tub 26 which will collect the oil from this film and discharge it through the pipes 27. This oil, heated by the shearing and the friction, will therefore not risk of heating up the oil that will be conveyed through the pipes 10*d*. The risk of mixing hot oil and cold oil is therefore reduced or even prevented, which significantly improves the lubrication of the reduction gear and thus the efficiency of the reduction gear.

FIG. 6 shows that the tubs 26 are positioned in the regions of low mechanical loads in order to prevent damage to the bearings during operation due to mechanical stress. During operation, an offset is created between the supports 10*b* and the planet gears 8. This offset is created by the centrifugal force and the meshing forces exerted on the planet gears 8. The offset support 10*b* creates a variation in the radial clearance between the support and the planet gear. The minimum clearance is in the zone close to the axis X of the planet carrier 10, while the maximum clearance is in the zone located near the oil conveying pipes 10*d*, which are located at the outer periphery of the planet carrier 10. The supports 10*b* extend around their axes Y.

Thus, taking into account the direction of rotation of the planet gear 8 (arrow F1), a converging zone (otherwise known as the active zone Z1) corresponding to the sector 24 is created beginning with the oil conveying pipes 10*d* and ending with the corner of oil (minimum radial clearance), and a diverging zone corresponding to the sector 25 is created between the corner of oil (minimum radial clearance) and the pipes 10*d*. This second zone is called the inactive zone Z2 or breaking of film zone in which a cavitation of the oil takes place.

The oil is compressed in the convergent zone (active zone Z1 corresponding to the sector 24), and the pressure generated balances the centrifugal and meshing loads on the planet gear. In the inactive zone Z2 corresponding to the sector 25, the oil cavitation causes the absolute oil pressure to be almost zero (precisely equal to the cavitation pressure).

Figure 7:
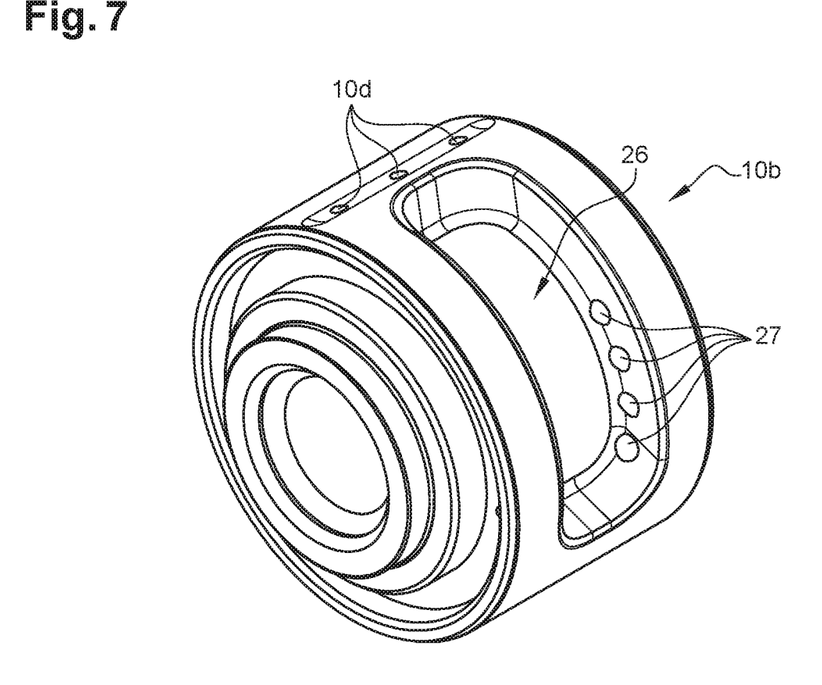
FIG. 7 is a perspective view of a planet gear tubular support of another embodiment of the reduction gear according to the invention.

FIGS. 7 and 8 show another embodiment of the support 10*b* for a mechanical reduction gear according to the invention. This alternative embodiment comprises all the characteristics of the previous embodiment and differs from it in the number and the position of the oil discharge pipes 27.

The number of pipes in each set is 4 on each side of the support 10*b*. These pipes 27 are evenly spaced from each other, but they are herein located on a circumferential half of the tub 26, i.e. on the side opposite to the pipes 10*d*. The pipes 27 are thus spaced from the pipes 10*d*. This creates an oil accumulation buffer zone in the circumferential half of the tub 26 located on the side of the pipes 10*d*. This buffer zone allows the buffer zone of the oil cavity in the tub 26 to achieve a recompression of the oil bubbles and to cool the used oil.

The gains brought by this invention are in particular:
hydrodynamic bearings and a lighter reduction gear (10 to 25% less mass in each bearing);
20% less losses (shearing of the oil in the bearing);
less misalignment of the toothing
radial forces reduced by 20% in the planet carrier, less stress and therefore the possibility to lighten it;
better discharge of calories; and
possibility of creating a particle trap and a buffer zone for the oil bubbles cavitating between the planet gear and the bearing.

The reduction in the bearing mass has a positive impact on the operation of the reduction gear. It reduces displacements of the bearings, which in turn reduces misalignment. Reducing misalignment increases the efficiency and reliability of the reduction gear. Finally, it also reduces the stress in the planet carrier, which can be lightened in turn.

The invention claimed is:

1. A mechanical reduction gear for a turbomachine, in particular for an aircraft, the reduction gear comprising:
   a sun gear having an axis of rotation,
   a ring gear which extends around the sun gear,
   planet gears which are meshed with the sun gear and the ring gear and which are held by a planet carrier which is configured to be in rotation around said axis, each of the planet gears being guided in rotation by a hydrodynamic bearing formed by a tubular support around which the planet gear is rotatably mounted, and
   a lubricating oil distributor which is configured to supply oil to internal cavities of said tubular supports, each of the tubular supports comprising oil conveying pipes from its internal cavity to its outer periphery for the formation of an oil film between the support and the planet gear, wherein each of the tubular supports comprises:

a first angular sector around an axis of the support, which comprises said conveying pipes and a first outer peripheral surface for forming said oil film, and a second angular sector around the axis of the support, which comprises a second outer peripheral surface in which a breaking tub of the oil film and recovering of the oil is formed, said first sector and said second sector are distinct.

2. The mechanical reduction gear according to claim 1, wherein the conveying pipes are located in the same plane passing through the axis of the support.

3. The mechanical reduction gear according to claim 1, wherein the conveying pipes open into the same groove formed in said first peripheral surface.

4. The mechanical reduction gear according to claim 1, wherein the first sector has an angular range greater than or equal to that of the second sector.

5. The mechanical reduction gear according to claim 1, wherein the angular extensions of the first and second sectors are equal to 360°.

6. The mechanical reduction gear according to claim 1, wherein the first sector has an angular range of 180° to 270°, and said second sector has an angular range of 90° to 180°.

7. The mechanical reduction gear according to claim 1, wherein the tub has a general elongated shape in the circumferential direction and extends over the entire angular range of said second sector.

8. The mechanical reduction gear according to claim 1, wherein the tub is axially delimited by two side walls which extend in the circumferential direction and form said second peripheral surface, and by two circumferential end walls, one of which is located in the vicinity of said conveying pipes.

9. The mechanical reduction gear according to claim 1, wherein each of the tubular supports comprises a first annular groove located on a first axial end of the support, and a second annular groove located on a second axial end of the support, the first and second grooves being oriented in opposite axial directions, and wherein oil discharge pipes provide fluid communication between the tub and these grooves.

10. The mechanical reduction gear according to claim 9, wherein the discharge pipes comprise openings in the tub, which are distributed over the entire circumferential range of this tub.

11. The mechanical reducer according to claim 9, wherein the discharge pipes comprise openings in the tub, which are located over only part of the circumferential range of this tub and which are spaced from said conveying pipes.

12. A turbomachine, in particular for an aircraft, comprising a mechanical reduction gear according to claim 1.

* * * * *